US006960847B2

(12) United States Patent
Suzuki et al.

(10) Patent No.: US 6,960,847 B2
(45) Date of Patent: Nov. 1, 2005

(54) ELECTROMAGNETIC ACTUATOR AND COMPOSITE ELECTROMAGNETIC ACTUATOR APPARATUS

(75) Inventors: Yuzuru Suzuki, Shizuoka-ken (JP); Sakae Fujitani, Shizuoka-ken (JP); Naoyuki Harada, Shizuoka-ken (JP); Kunitake Matsushita, Shizuoka-ken (JP)

(73) Assignee: Minebea Co., Ltd., Nagano-ken (JP)

(*) Notice: Subject to any disclaimer, the term of this patent is extended or adjusted under 35 U.S.C. 154(b) by 109 days.

(21) Appl. No.: 09/862,374

(22) Filed: May 22, 2001

(65) Prior Publication Data

US 2003/0205941 A1 Nov. 6, 2003

(30) Foreign Application Priority Data

May 23, 2000 (JP) ............................ 2000-152065

(51) Int. Cl.[7] ............................................ H02K 41/00

(52) U.S. Cl. ................ 310/14; 310/156.46; 310/49 R; 310/23; 310/13; 335/229

(58) Field of Search ........................... 310/49 R, 40 R, 310/46, 12–14, 156.64–156.65; H02K 41/00; 335/256

(56) References Cited

U.S. PATENT DOCUMENTS 3,777,196 A * 12/1973 Field, II ................ 310/156.64
4,041,336 A * 8/1977 Sudler et al. ............ 310/49 R
4,127,802 A * 11/1978 Johnson .................... 310/49 R
4,306,164 A * 12/1981 Itoh et al. ................ 310/49 R
4,358,691 A 11/1982 Naylor
4,422,060 A * 12/1983 Matsumoto et al. ........ 335/256
4,490,815 A 12/1984 Umehara et al.
4,503,368 A * 3/1985 Sakamoto ................. 310/49 R
4,764,697 A * 8/1988 Christiaens ............... 310/49 R
4,868,432 A * 9/1989 Frandsen ..................... 310/12
4,928,028 A * 5/1990 Leibovich .................... 310/23
5,134,326 A * 7/1992 Sakamoto .................... 310/14
5,947,155 A 9/1999 Miki et al.
6,049,151 A * 4/2000 Suzuki et al. ................. 310/80
6,331,746 B1 * 12/2001 Fujitani et al. ............. 310/263
6,365,994 B1 * 4/2002 Watanabe et al. ......... 310/49 R

FOREIGN PATENT DOCUMENTS

CH 624522 A5 * 7/1981 .......... H04R 11/00
DE 1489088 10/1964
GB 2052886 A * 1/1981 ......... H02K 33/16
GB 2243488 A 10/1991

(Continued)

*Primary Examiner*—Darren Schuberg
*Assistant Examiner*—J. Aguirrechea
(74) *Attorney, Agent, or Firm*—Choate Hall & Stewart LLP

(57) ABSTRACT

An electromagnetic actuator with high performance such as high speed and high resolution is inexpensively provided with solutions to problems associated with power supply and leakage flux, which have been involved in the structure of a moving coil type and have been shortcomings of a VCM type actuator. A composite electromagnetic actuator apparatus employs the foregoing electromagnetic actuator. The electromagnetic actuator is equipped with a stationary assembly that includes two coils disposed coaxially with each other inside a hollow stator yoke composed of a soft magnetic material, and a movable assembly composed of a movable magnet unit and a movable yoke unit both disposed inside the coils with a very small clearance therefrom so as to be movable in the axial direction, wherein the movable assembly travels in the axial direction by the interaction between a magnetic field generated by the movable magnet unit and a current passing through the coils.

15 Claims, 9 Drawing Sheets

FOREIGN PATENT DOCUMENTS

JP 2000224827 A * 8/2000 .......... H02K 33/12
JP 2000224830 A * 8/2000 .......... H02K 33/16
WO WO 93/19513 9/1993

* cited by examiner $F = \overrightarrow{F_1 + F_2}$ $F = \overleftarrow{F_3 + F_4}$

ELECTROMAGNETIC ACTUATOR AND COMPOSITE ELECTROMAGNETIC ACTUATOR APPARATUS

BACKGROUND OF THE INVENTION

1. Field of the Invention

The present invention relates to an electromagnetic actuator that linearly travels in an axial direction and, more particularly, to a moving-magnet type electromagnetic actuator that has a stator yoke on its outer peripheral portion and includes therein a movable section composed of one or more exciting coils, permanent magnets, and yokes, and also to a composite electromagnetic actuator apparatus.

2. Description of Related Art

An example of conventionally known electromagnetic actuators is a moving-coil type actuator that is used to drive an information read/write head of an information storage device, and adapted to directly drive the head linearly or rotationally and to position it to an appropriate track of a recording medium, thereby reading or writing information from or to the recording medium. This actuator, known as a voice coil motor (VCM), drives a head attached to a coil by making use of an electromagnetic force generated according to Fleming's left-hand rule, that is by causing current to flow through a coil that constitutes a component at right angles to a magnetic field. This type of actuator is capable of accurate positioning control by employing a feedback control technique within a linear range of a travel distance of about 10 mm or a rotational range of a rotation angle of about 90 degrees.

Another example of the electromagnetic actuators employs an inexpensive two-phase claw-pole stepping motor. In this type of actuator, a lead screw is formed on a motor shaft, and a head movably attached on the shaft through the screw moves linearly as the motor runs.

The moving-coil type (VCM type) actuator described above, however, has the following disadvantages:

(1) The travel range is large, so that the air gap length between a magnet and a coil cannot be set to a small value. This means that the magnetic flux density of the air gap cannot be set to a high value.

(2) A sufficient thrust or electromagnetic force cannot be obtained unless a high-performance magnet is used.

(3) The coil is movable, making it difficult to increase the number of turns. This inevitably leads to an increased bulk.

(4) Electric power must be supplied to the movable coil, requiring an expensive feeder harness.

(5) Since the travel range is large, supposing the mass of the movable section remains unchanged, equivalent frequency responsiveness cannot be secured unless a larger thrust is generated.

(6) The VCM cannot provide a magnetic circuit with a closed structure, resulting in large leakage flux to the outside.

(7) Since the leakage flux cannot be reduced, the use with a magnetic storage device may adversely affect its read/write reliability.

The above disadvantages have been placing major restrictions on using the actuator with a magnetic recording apparatus. In addition, there has been a problem that the cost cannot be reduced due to the shortcomings mentioned above.

On the other hand, an actuator employing a two-phase claw-pole stepping motor has the following disadvantages:

(1) A mechanical converting means such as a screw for converting a rotational movement into a linear movement is required.

(2) Performance of both high speed and high resolution is limited because the actuator does not employ a direct coupling method.

(3) A stepping motor based on an open-loop control is used as a driving source and hence, it is impossible to continuously perform positioning, and resolution of positioning is limited. In particular, current resolution available at present is about 100 μm at the best.

(4) This type of actuator generally employs an open-loop control, and is not suited for a closed-loop control.

SUMMARY OF THE INVENTION

An object of the present invention is to provide an electromagnetic actuator that escapes the problems associated with power supply and leakage flux, which have been involved in the structure of moving coil type and have been shortcomings of a VCM type actuator, and that is available inexpensively and still exhibits high performance including a higher speed and a higher resolution. Another object of the present invention is to provide a composite electromagnetic actuator apparatus, which is an application of the foregoing electromagnetic actuator.

To this end, according to one aspect of the present invention, there is provided an electromagnetic actuator equipped with a stationary assembly that includes two coils disposed coaxially with each other inside a hollow stator yoke composed of a soft magnetic material and a movable assembly that includes a movable magnet unit and a movable yoke unit both disposed inside the coils with a very small clearance therefrom so as to be movable in the axial direction, wherein the movable assembly travels in the axial direction by the interaction between a magnetic field generated by the movable magnet unit and a current passing through the coils.

In a preferred form of the present invention, the direction of the current passing through one of the two coils is opposite from the direction of the current passing through the other coil.

In another preferred form of the present invention, the two coils are wound on respective separate bobbins made of a synthetic resin and having a substantially identical shape with each other. The two bobbins with the respective coils wound thereon are disposed inside the stator yoke with a predetermined distance provided therebetween in the axial direction.

In yet another preferred form of the present invention, the stator yoke of the stationary assembly is a hollow cylinder, the two coils are ring-shaped and wound on the respective cylindrical bobbins, the movable assembly has a supporting shaft at the center thereof, the movable yokes are located such that the movable yokes and the two coils effect electromagnetic action on each other, the stator yoke is provided with a pair of flanges at both its axial end surfaces, each flange having a bearing mechanism, and the supporting shaft is retained by the bearing mechanisms so as to be movable in the axial direction.

In a preferred form of the present invention, the movable magnet unit of the movable assembly is formed of at least one columnar or hollow magnet axially magnetized with two opposite polarities, namely, north pole and south pole, and the movable yoke unit is constituted by a pair of soft magnetic members that have a substantially identical configuration with each other and are disposed to sandwich the movable magnet unit and to abut respectively against a north-pole end surface and a south-pole end surface thereof.

In another preferred form of the present invention, the movable yoke unit of the movable assembly is constructed by one or more columnar or hollow soft magnetic members, and the movable magnet unit is constructed by a pair of magnets that have a substantially identical configuration with each other, are disposed to sandwich the movable yoke unit and to abut against both axial end surfaces thereof and are magnetized so that the inward portion and the outward portion of one magnet are polarized oppositely from each other and that the outward portion of one magnet is polarized oppositely from the outward portion of the other magnet.

In still another preferred form of the present invention, in case where the movable magnet unit of the movable assembly is formed of at least one columnar or hollow magnet axially magnetized with two opposite polarities, namely, north pole and south pole, and where the movable yoke unit is constituted by a pair of soft magnetic members that have a substantially identical configuration with each other and are disposed to sandwich the movable magnet unit and to abut respectively against a north-pole end surface and a south-pole end surface thereof, the outer diameter of the movable magnet unit of the movable assembly is set to be smaller than the outer diameter of the movable yoke unit. Conversely, in case where the movable yoke unit of the movable assembly is constructed by one or more columnar or hollow soft magnetic members, and where the movable magnet unit is constructed by a pair of magnets that have a substantially identical configuration with each other, are disposed to sandwich the movable yoke unit and to abut against both axial end surface thereof and are magnetized so that the inward portion and the outward portion of one magnet are polarized oppositely from each other and that the outward portion of one magnet is polarized oppositely from the outward portion of the other magnet, the outer diameter of the movable yoke unit of the movable assembly is set to be smaller than the outer diameter of the movable magnet unit.

In a preferred form of the present invention, the travel distance of the movable assembly in the axial direction is set to 1.0 mm or less.

According to another aspect of the present invention, there is provided an electromagnetic actuator constituted by a stationary assembly that includes a plurality of paired coils each of which is composed of two coils and which are disposed coaxially with each other inside a hollow stator yoke composed of a soft magnetic material and a movable assembly in which movable units, each comprising a movable magnet unit and a movable yoke unit, of a plural number identical with that of the paired coils are axially disposed on a same axis inside the coils in such a manner as to be spaced apart from the stationary assembly by a very small distance, wherein the movable assembly moves in the axial direction by the interaction between magnetic fields generated by the movable magnet unit and currents passing through the coils.

According to yet another aspect of the present invention, there is provided a composite electromagnetic actuator apparatus which comprises an electromagnetic actuator in accordance with the present invention, a stepping motor disposed on the same rotating shaft as electromagnetic actuator, and a converting mechanism for converting the rotational motion of the rotating shaft by the stepping motor into a linear motion, and in which the electromagnetic actuator causes the rotating shaft to move linearly, wherein rough adjustment by the stepping motor is performed in an open loop, while fine adjustment by the electromagnetic actuator is performed in a closed loop.

In the composite electromagnetic actuator apparatus in accordance with the present invention, the stepping motor is a two-phase claw-pole type.

Preferably, the composite electromagnetic actuator apparatus in accordance with the present invention is used as an actuator for positioning an information read/write head to a target track on a recording medium of an information storage device.

In the composite electromagnetic actuator apparatus in accordance with the present invention, a spacer composed of a nonmagnetic member is provided between the stepping motor and the electromagnetic actuator.

DETAILED DESCRIPTION OF THE PREFERRED EMBODIMENTS

The present invention will now be described with reference to the accompanying drawings.

Figure 1:
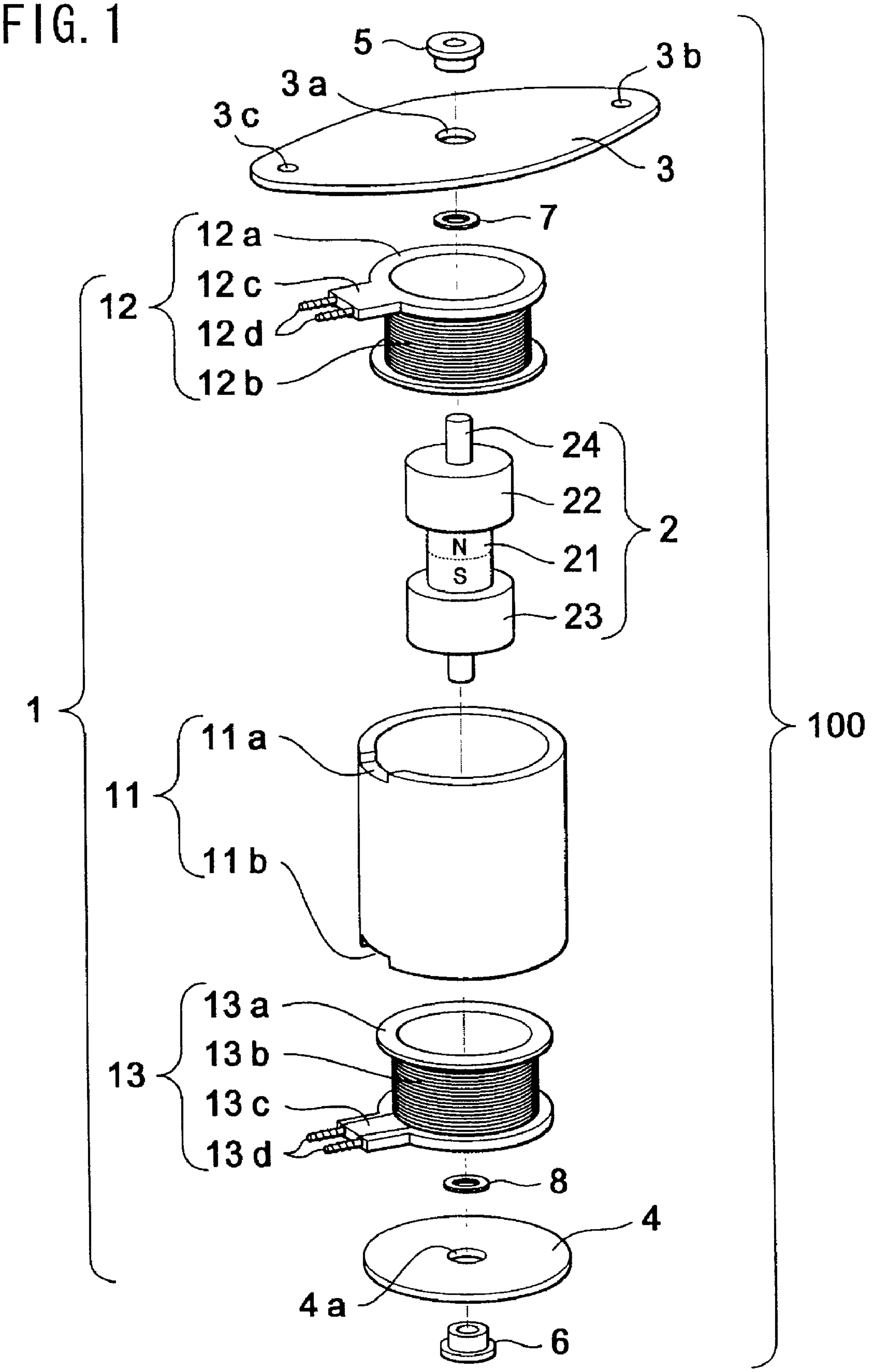
FIG. 1 is an exploded perspective view of an embodiment of an electromagnetic actuator in accordance with the present invention.

FIG. 1 is an exploded perspective view showing a first embodiment of an electromagnetic actuator in accordance with the present invention. An electromagnetic actuator 100 is roughly divided into a stationary assembly 1, a movable assembly 2, a front flange 3, and a rear flange 4.

The stationary assembly 1 includes two identical cylindrical coil assemblies 12 and 13 stacked in the axial direction inside a cylindrical stator yoke 11 made of a soft magnetic member (e.g. a galvanized steel plate, a pure iron plate, a resin containing soft magnetic powder, or a sintered compact of soft magnetic powder). The coil assemblies 12 and 13 are of the same structure, and have coils 12*b* and 13*b* wound on cylindrical bobbins 12*a* and 13*a*, respectively, that are formed of an insulative material, such as a synthetic resin. Terminal blocks 12*c* and 13*c* are integrally formed on the flanges of the bobbins 12*a* and 13*a*, respectively. Furthermore, wire binding terminals 12*d* and 13*d* are implanted in the terminal blocks 12*c* and 13*c*, respectively, and the wire ends of the coils 12*b* and 13*b* are bound on the wire binding terminals 12*d* and 13*d,* respectively. The upper edge and the lower edge of the stator yoke 11 are provided with cuts 11*a* and 11*b,* respectively, for receiving the terminal blocks 12*c* and 13*c* of the bobbins 12*a* and 13*a* accommodated in the stator yoke 11. The bobbins 12*a* and 13*a* may be of a one-piece type, as will be discussed hereinafter.

The movable assembly 2 is constructed by three members, namely, one hollow columnar movable magnet 21 that is located at the center thereof, has a small diameter, and is magnetized with two polarities N and S in the axial direction, a pair of hollow columnar movable yokes 22 and 23 that are made of a soft magnetic material, sandwich the movable magnet 21, and are secured to the polarized end surfaces of the movable magnet 21, and a supporting shaft 24 that goes through the center of the above members. The entire movable assembly 2 is disposed inside the coil assemblies 12 and 13 housed in the stator yoke 11 with a very small clearance therefrom so as to be movable in the axial direction. The outer diameter of the movable magnet 21 is set smaller than the outer diameter of the movable yokes 22 and 23 to prevent the magnetic fluxes of the movable magnet 21 from leaking directly to the stator yoke 11. With this arrangement, occurrence of leakage flux can be prevented thereby improving magnetic efficiency and the amount and weight of the magnets in the movable assembly 2 can be reduced thereby cutting down cost and improving frequency responsiveness.

Central holes 3*a* and 4*a* are provided at the centers of the front flange 3 and the rear flange 4, respectively, and bearings 5 and 6 are set in the central holes 3*a* and 4*a,* respectively, from the outside of the flanges 3 and 4 to hold the supporting shaft 24 so that the supporting shaft 24 may move in the axial direction. The front flange 3 is provided with mounting holes 3*b* and 3*c* for attaching the electromagnetic actuator 100 to an external system. Reference numerals 7 and 8 denote washers.

The operation and the power (thrust) generating principle of the electromagnetic actuator will now be described in conjunction with FIGS. 2A and 2B.

Figure 2A:
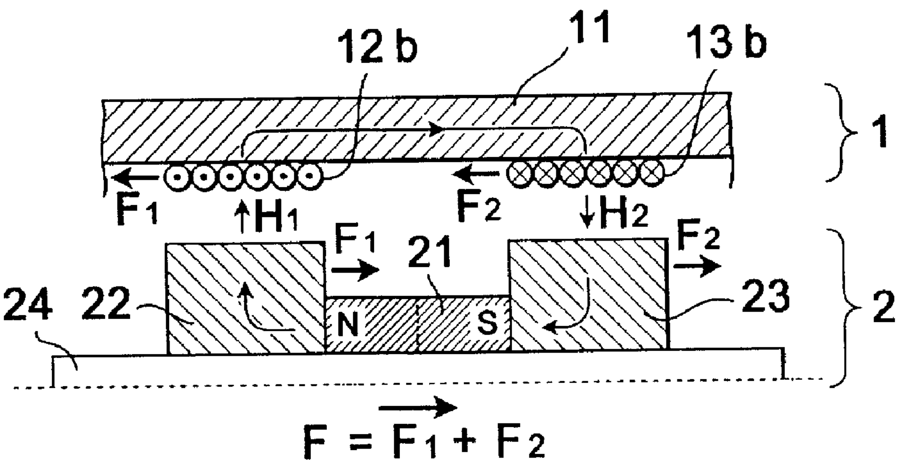
FIGS. 2A and 2B illustrate the principle of operation of the electromagnetic actuator in accordance with the present invention.
Figure 2B:
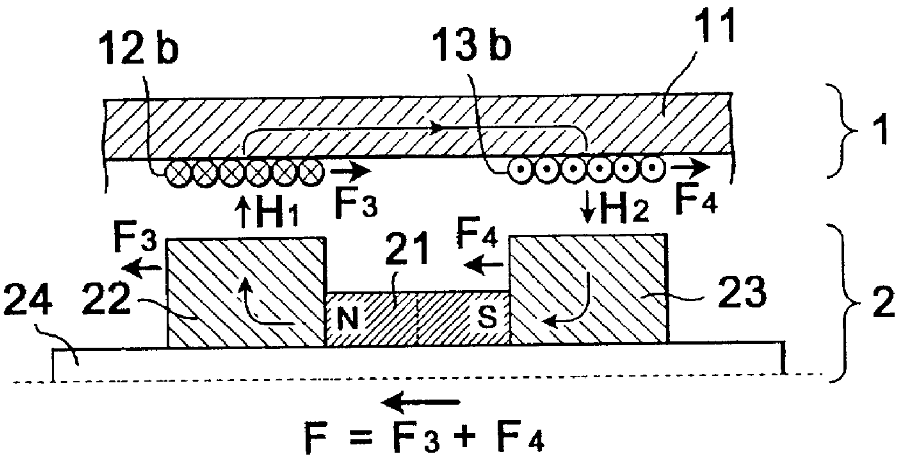

FIGS. 2A and 2B are half sectional views with respect to the central axis, showing the stationary assembly 1 and the movable assembly 2 (in the assembled state) of the electromagnetic actuator 100 shown in FIG. 1. FIG. 2A illustrates the principle of operation in a case where the movable assembly 2 is subjected to a rightward force (in the direction indicated by an arrow F in the drawing), and FIG. 2B illustrates the principle of operation in a case where the movable assembly 2 is subjected to a leftward force (in the direction indicated by an arrow F in the drawing). The bearings, the flanges, and the bobbins that are not directly related to the description of the principle are omitted. In the drawings, like reference numerals are assigned to like components as those shown in FIG. 1.

Referring first to FIG. 2A, it is assumed that currents in the coil 12*b* of the coil subassembly 12 are flowing from bottom to top in the drawing, while currents in the coil 13*b* of the coil subassembly 13 are flowing from top to bottom in the drawing. The magnetic field of the movable magnet 21 of the movable assembly 2 forms a magnetic circuit indicated as follows: North pole of the magnet 21→Movable yoke 22→Gap (Magnetic field $H_1$)→Coil 12*b*→Stator yoke 11→Coil 13*b*→Gap (Magnetic field $H_2$)→Movable yoke 23 →South pole of the magnet 21.

Attention should be focused on the magnetic fields $H_1$ and $H_2$ in the area of the gaps in the foregoing magnetic circuit. The directions of the magnetic fields $H_1$ and $H_2$ in the area of the gaps are opposite from each other, but the magnitudes thereof are equal to each other. In other words, the magnetic field $H_1$ is oriented from the movable yoke 22 toward the stator yoke 11, while the magnetic field $H_2$ is oriented from the stator yoke 11 toward the movable yoke 23. These magnetic fields $H_1$ and $H_2$ have magnitude in the gaps, and preferably the magnitudes of the magnetic fields in the gaps remain unchanged even when the movable assembly 2 travels in the axial direction. This is because if the magnitudes of the magnetic fields in the gaps remain unchanged, then the thrust generated by the same value of the coil current stays constant independently of the position of the movable assembly 2. This improves the controllability in a case where the electromagnetic actuator in accordance with the present invention is employed as a positioning mechanism (which will be discussed hereinafter).

If currents are caused to flow through the ring-shaped coils 12*b* and 13*b* in the direction shown in FIG. 2A, then the coil 12*b* is subjected to a force in the direction indicated by an arrow $F_1$ (as a resultant force of the forces acting on the six turns of the coil in the drawing) according to Fleming's left-hand rule. The coil 12*b* is, however, secured to the stator yoke 11, so that the movable yoke 22 is subjected to the force $F_1$ in the opposite direction due to reaction. Similarly, the coil 13*b* is subjected to a force in the direction indicated by an arrow $F_2$ (as a resultant force of the forces acting on the six turns of the coil in the drawing), and the movable yoke 23 is subjected to the force $F_2$ in the opposite direction as reaction. If the frictional force of the supporting shaft 24 is ignored, then the entire movable assembly 2 is subjected to a thrust indicated by $F=F_1+F_2$ as a result, and this thrust causes the movable assembly 2 to travel axially in the right direction.

If currents are caused to flow through the coils 12*b* and 13*b* in the direction shown in FIG. 2B, then the coil 12*b* is subjected to a force in the direction indicated by an arrow $F_3$ (as a resultant force of the forces acting on the six turns of the coil in the drawing) according to Fleming's left-hand rule, and the movable yoke 22 is subjected to the force $F_3$ in the opposite direction as reaction. Similarly, the coil 13*b* is subjected to a force in the direction indicated by an arrow $F_4$ (as a resultant force of the forces acting on the six turns of the coil in the drawing), and the movable yoke 23 is subjected to the force $F_4$ in the opposite direction due to reaction. As a result, the entire movable assembly 2 is subjected to a thrust indicated by $F=F_3+F_4$ in the axial direction (toward the left in the drawing).

Thus, the electromagnetic actuator in accordance with the present invention allows the traveling direction and thrust magnitude of the movable assembly to be arbitrarily controlled by changing the direction and value of the current flowing through the ring-shaped coils 12*b* and 13*b*. Incorporating the electromagnetic actuator in, for example, closed-loop positioning control enables the movable assembly 2 to be arbitrarily positioned while moving the movable assembly 2 linearly. More specifically, in FIG. 2A if the movable assembly 2 is currently located to the right with respect to a target position, a large current is caused to flow through the coils 12*b* and 13*b* in the reversed direction (in the direction of the current shown in FIG. 2B) to quickly bring the movable assembly 2 close to the target position. Then, the value of the coil current is reduced to stop the movable assembly 2 at the target position. If the movable assembly 2 should overrun the target position, the direction of the current is reversed to draw back the movable assembly 2.

In this way, the movable assembly 2 can be always brought to its target position by monitoring the current position of the movable assembly 2 relative to the target position and continuously changing the direction and value of current according to the monitoring.

Figure 3:
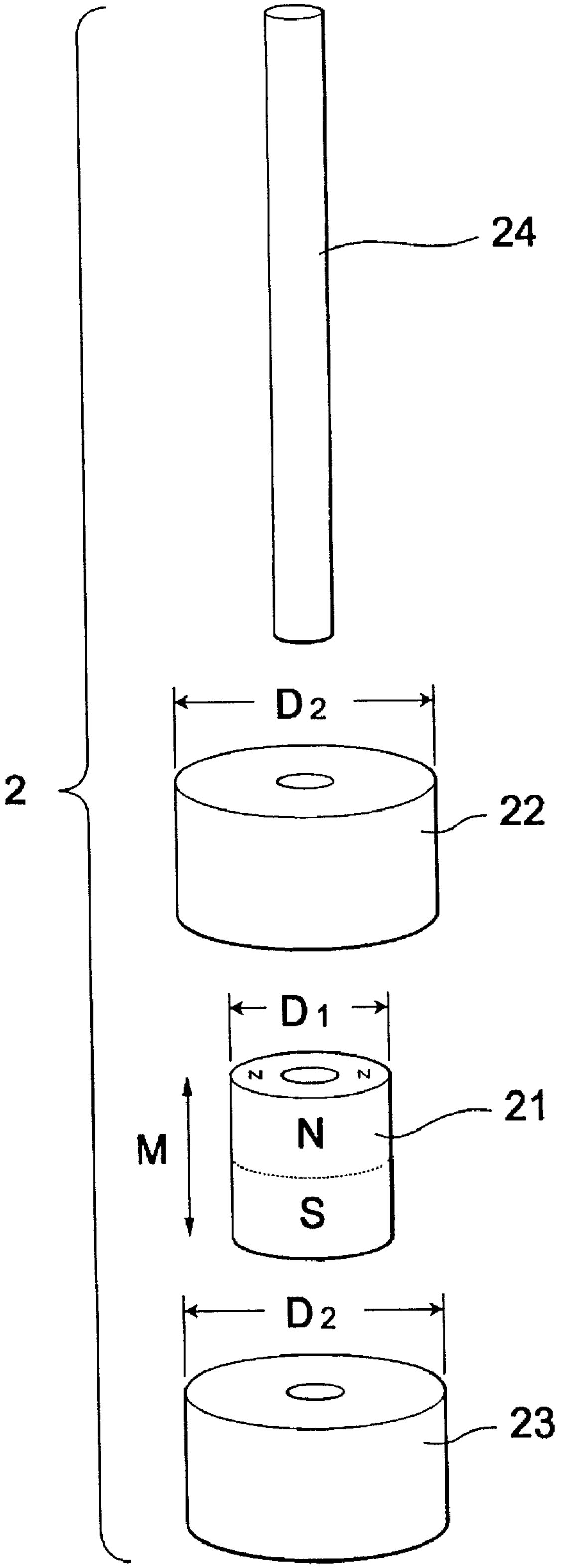
FIG. 3 is an exploded perspective view of a movable assembly of the electromagnetic actuator shown in FIG. 1.

FIG. 3 is an exploded perspective view of the movable assembly 2 according to the embodiment shown in FIG. 1.

The hollow cylindrical movable magnet 21 is magnetized with two polarities, namely, north pole and south pole in the axial direction (in the direction indicated by an arrow M). The hollow cylindrical movable yoke 22 is secured to the axial end surface of the movable magnet 21 toward the north pole, and the movable yoke 23 having the same shape and dimensions as the movable yoke 22 is secured to the axial end surface of the movable magnet 21 toward the south pole. The supporting shaft 24 passes through the central holes of the movable magnet 21 and the movable yokes 22 and 23, thereby supporting the entire movable assembly.

The outer diameter $D_1$ of the movable magnet 21 is set to be smaller than the outer diameter $D_2$ of the movable yokes 22 and 23. This is effective in reducing leakage flux. As can be understood from the magnetic circuit shown in FIG. 2, the movable magnet 21 is required to pass as much magnetic flux as possible in the axial direction. For this purpose, it is necessary to reduce the "leakage flux" that jumps from the movable magnet 21 to the stator yoke 11 of the stationary assembly 1. This can be effectively accomplished by setting the outer diameter $D_1$ of the movable magnet 21 smaller than the outer diameter $D_2$ of the movable yokes 22 and 23. In addition, the frequency responsiveness can be improved with reduction in the weight of the movable assembly 2, and at the same time the cost of the actuator can be cut down with reduction in the amount of an expensive magnetic material.

Figure 4:
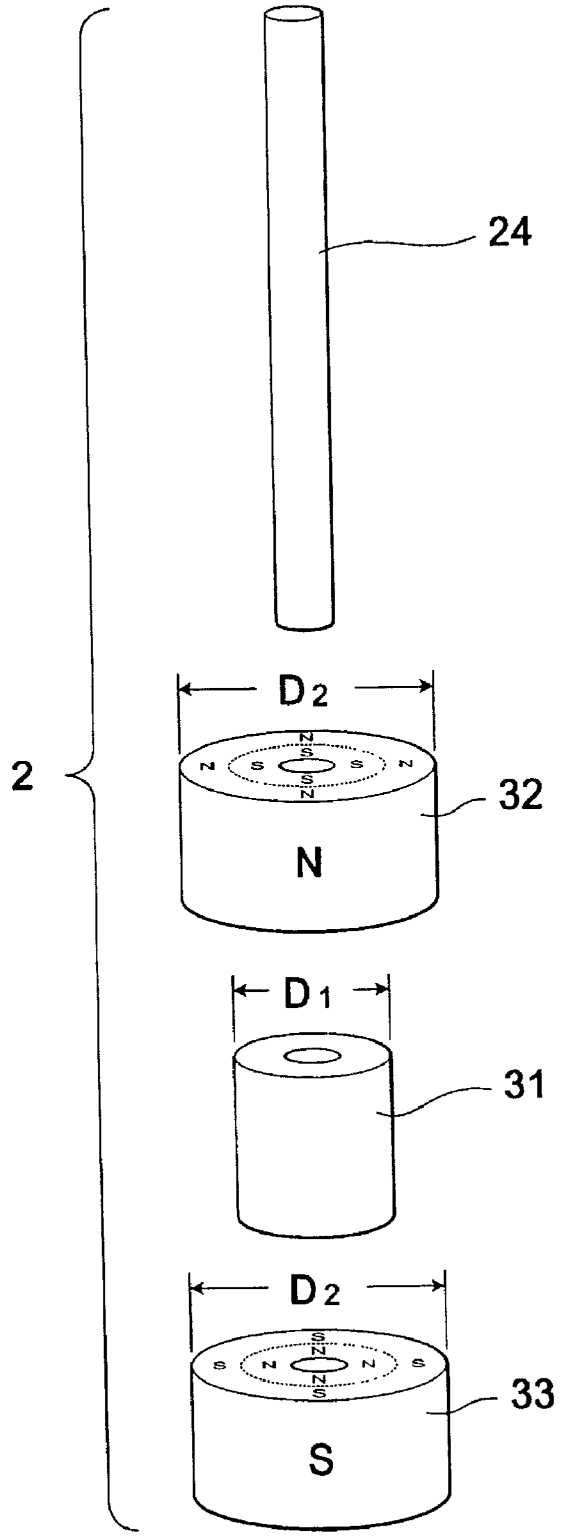
FIG. 4 is an exploded perspective view of another embodiment of the movable assembly of the electromagnetic actuator in accordance with the present invention.

FIG. 4 shows another embodiment of the movable assembly of the actuator.

In this embodiment, a movable yoke 31 that is composed of a soft magnetic member and has a small diameter is provided at the center of the entire assembly, two movable magnets 32 and 33 are provided on both sides of the movable yoke 31, and a supporting shaft 24 penetrates the center of the entire movable assembly. The upper movable magnet 32 is radially magnetized so that the inward portion near its central hole bears south pole and the outward portion bears north pole. The lower movable magnet 33 is magnetized so that the inward portion near its central hole bears north pole and the outward portion bears south pole. The outer diameter $D_1$ of the movable yoke 31 is set to be smaller than an outer diameter $D_2$ of the movable magnets 32 and 33 for the technological reason described in connection with the first embodiment.

Figure 5:
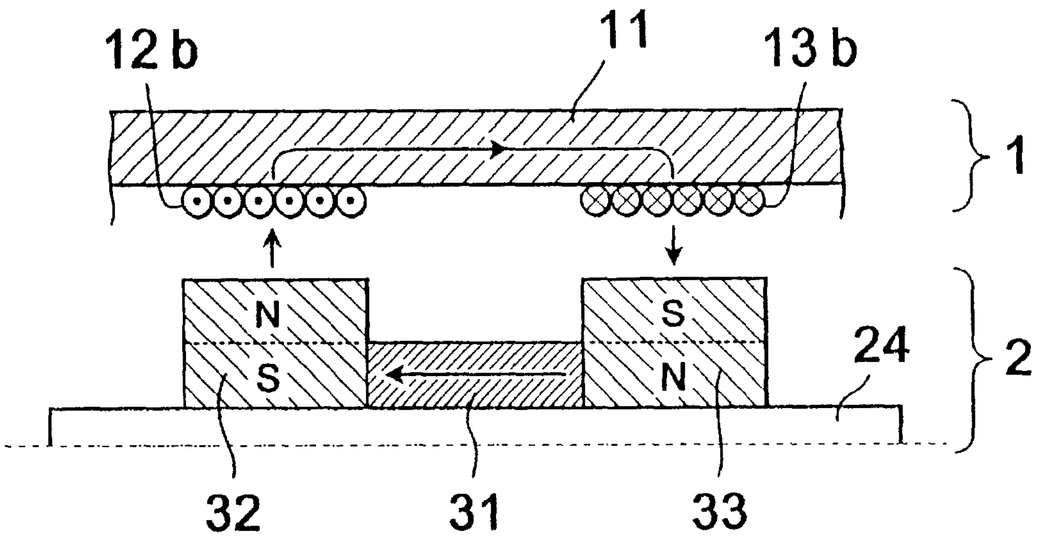
FIG. 5 is similar to FIGS. 2A and 2B which illustrate the principle of operation of an electromagnetic actuator employing the movable assembly shown in FIG. 4.

A magnetic circuit for the movable assembly is shown in FIG. 5. The components of a stationary assembly 1 shown in the drawing are denoted using the same reference numerals shown in FIGS. 2A and 2B.

As in the case shown in FIGS. 2A and 2B, the movable magnets 32 and 33 form a magnetic circuit indicated by the arrows. Hence, current flowing through coils 12*b* and 13*b* causes an electromagnetic force to be produced as in the case shown in FIGS. 2A and 2B. The produced electromagnetic force moves the movable assembly 2 in the axial direction.

Figure 6:
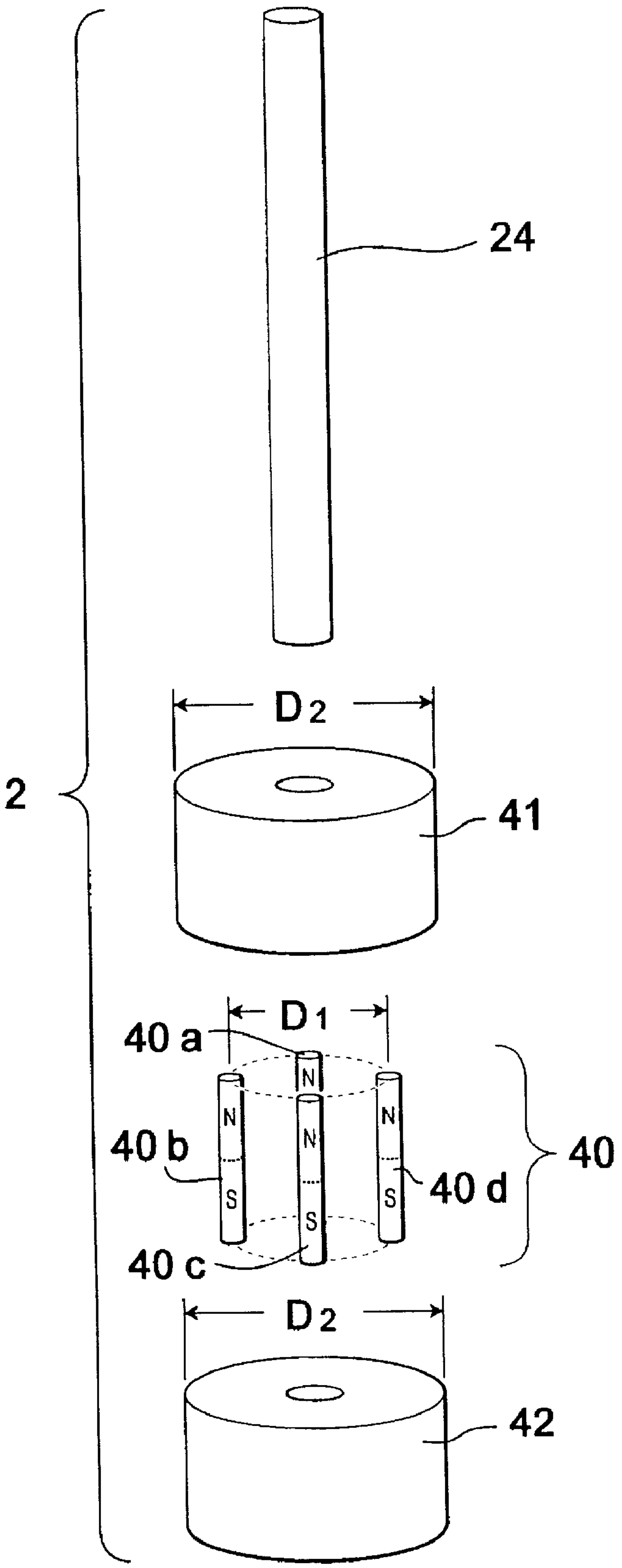
FIG. 6 is an exploded perspective view of yet another embodiment of the movable assembly of the electromagnetic actuator in accordance with the present invention.

FIG. 6 shows still another embodiment of the movable assembly of the actuator.

In this embodiment, a movable magnet unit 40 consisting of a plurality of (four in the example shown in the drawing) columnar magnets 40*a,* 40*b,* 40*c,* and 40*d* is provided at the center of the entire assembly, movable yokes 41 and 42 made of soft magnetic members are provided on both axial ends of the movable magnet unit 40, and a supporting shaft 24 penetrates the center of the entire assembly. The columnar magnets 40*a,* 40*b,* 40*c,* and 40*d* are axially magnetized with two opposite polarities, namely, north pole and south pole. The magnetic circuit formed in the movable assembly and the basic operation are the same as those described with reference to FIG. 2, and the description will not be repeated.

A major advantage of this embodiment is that the weight of the movable assembly can be reduced improving frequency responsiveness, and the amount of magnet required can be reduced cutting down cost.

The number of the columnar magnets making up the movable magnet unit 40 is not limited to four, and the configuration of the magnets does not have to be columnar. From the viewpoint of leakage flux, it is preferable that the plurality of columnar magnets be equally disposed so that the dimension $D_1$ of the movable magnet unit 40 is about half as large as the outer diameter $D_2$ of the movable yokes 41 and 42.

Figure 7:
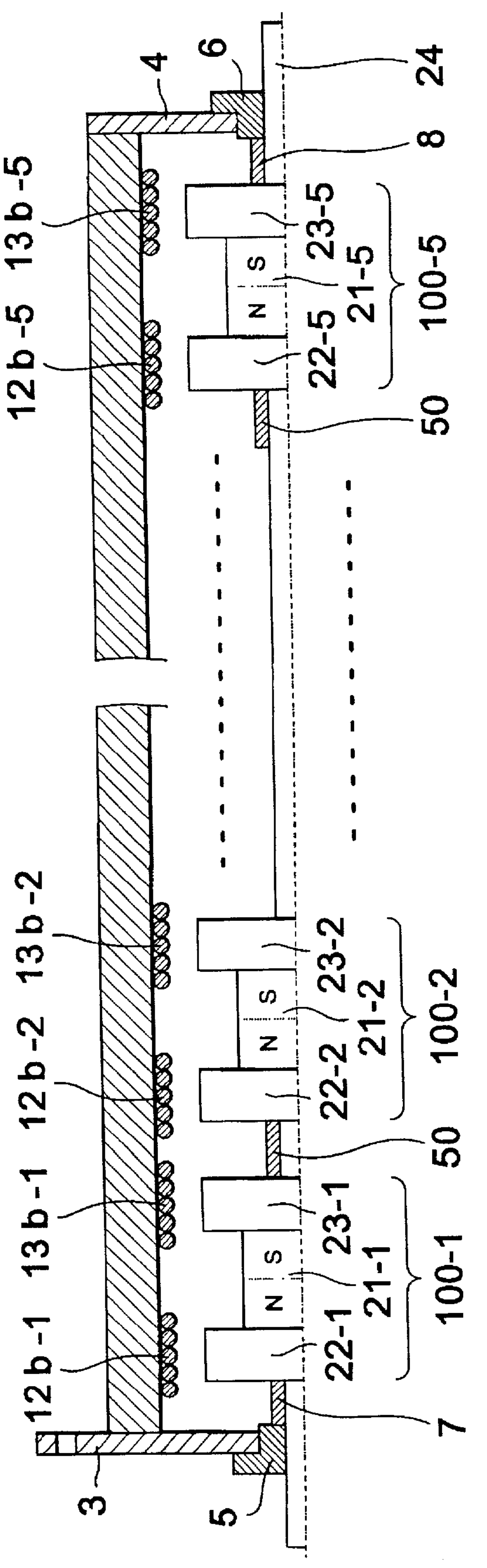
FIG. 7 is a half sectional view of a multi-stack electromagnetic actuator in accordance with the present invention.

FIG. 7 is a half sectional view of a multi-stack electromagnetic actuator constituted by five actuator units, each comprising the stationary assembly 1 and the movable assembly 2 of the electromagnetic actuator shown in FIG. 1. The five actuator units are coupled axially in series on a single common shaft and housed in a single stator yoke. In the drawing, the like components as those shown in FIG. 1 are denoted by like reference numerals, and the like components of the five actuator units are identified by suffix numerals "–1", "–2" . . . "–5".

A supporting shaft 24 of the movable assembly is provided with spacers 50 having an appropriate length and disposed between the respective actuator units thereby to ensure an appropriate positional relation between the movable assembly and coils. Regarding the actuator units 100-1, 100-2, . . . , and 100-5, the operation for generating the axial thrust has been described with reference to FIG. 2 and FIG. 5, so the description will be omitted. By coupling the plurality of actuator units in the axial direction, the thrusts produced by the respective actuator units aggregate, making it possible to easily increase its thrust as a whole. The number of the coupled actuator units is not limited to five.

Figure 8:
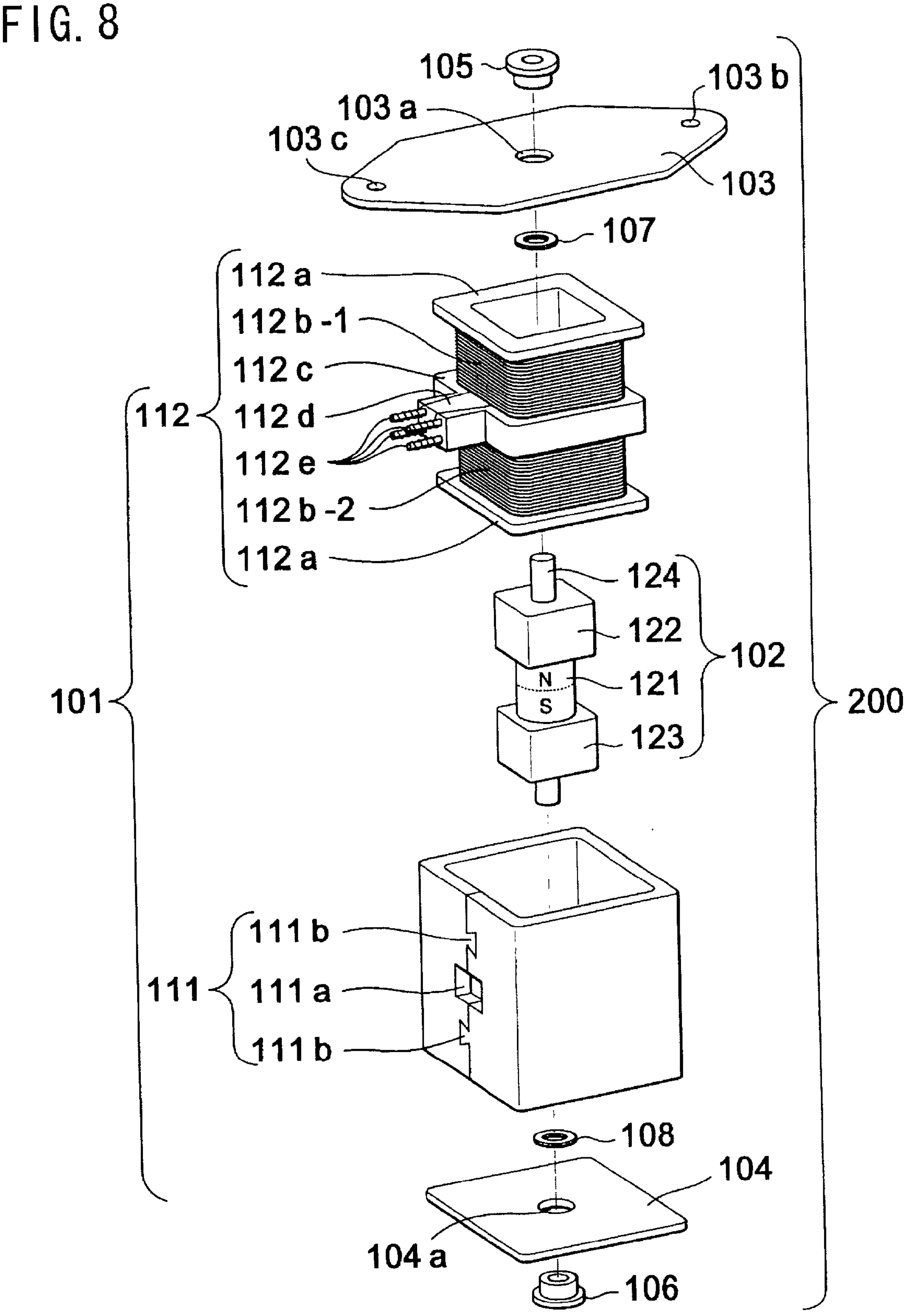
FIG. 8 is an exploded perspective view of a second embodiment of the electromagnetic actuator in accordance with the present invention.

FIG. 8 is an exploded perspective view showing a second embodiment of the electromagnetic actuator in accordance with the present invention. The components that correspond to the components of the first embodiment shown in FIG. 1 are denoted by adding 100 to the reference numerals shown in FIG. 1, and the description of components requiring no particular explanation will be omitted.

An electromagnetic actuator 200 according to the second embodiment is constituted by a stationary assembly 101 composed of a coil subassembly 112 and a stator yoke 111, a movable assembly 102 composed of a columnar movable magnet 121 and movable yokes 122 and 123 shaped like quadrangular prisms and disposed respectively on both sides of the columnar movable magnet 121 and a supporting shaft 124 penetrating the centers of the above components, a front flange 103 and a rear flange 104. Reference numerals 105 and 106 denote bearings, and reference numerals 107 and 108 denote washers.

This embodiment is characterized by the structure of the stationary assembly 101. More specifically, the stationary assembly 101 is shaped like a quadrangular prism rather than the round column as in the first embodiment, and the coil subassembly 112 has only one bobbin 112*a* rather than two. Accordingly, the movable assembly 102 disposed inside the coil subassembly is also shaped like a quadrangular prism.

The following will describe the distinctive coil subassembly 112.

The coil subassembly 112 is constructed by a single resinous bobbin 112*a* having two sections for windings, and two coils 112*b*-1 and 112*b*-2. The bobbin 112*a* has a separator 112*c* at the middle thereof, which isolates the two coils 112*b*-1 and 112*b*-2 from each other. The bobbin 112*a* has a rectangular shape that matches the shape of the stator yoke 111, and an opening which is present at the center of the bobbin 112*a* and accommodates the movable assembly 102 is also rectangular. The opening may alternatively be round as in the first embodiment. A terminal block 112*d* is formed on a part of the separator 112*c* of the bobbin 112*a,* and wire binding terminals are implanted in the terminal block 112*d.*

The stator yoke 111 is made such that a plane soft magnetic plate is formed into a quadrangular prism and both its ends are joined to each other. A square opening 111*a* for receiving the terminal block 112*d* formed on the separator 112*c* of the bobbin 112 is provided at the center of the joint face in order to lead out the coils via an insulative bushing (not shown). Locking mechanisms 111*b* are also formed on the joint face of the stator yoke 111.

The second embodiment is characterized in that the coil subassembly 112 can be easily formed of the only one bobbin 112*a,* and that its coaxiality can be accurately ensured.

Figure 9:
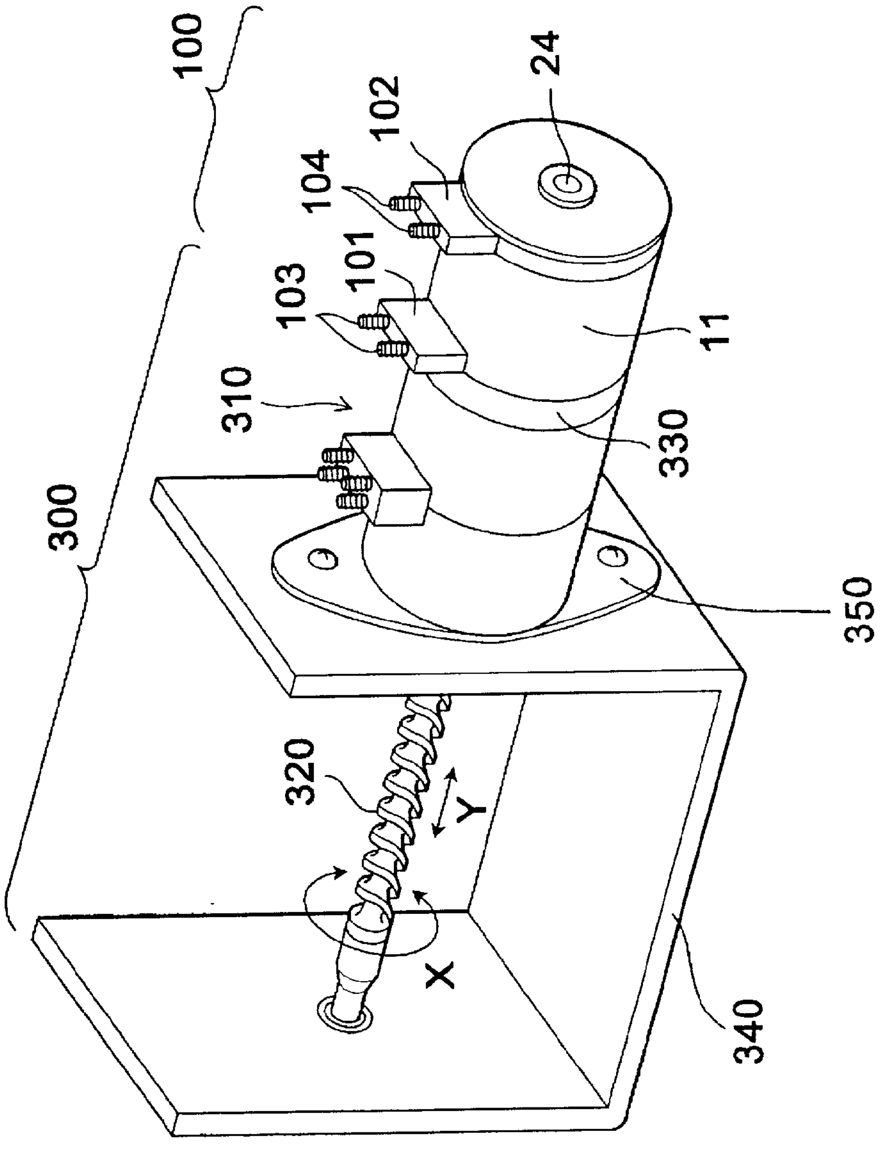
FIG. 9 is a perspective view of an embodiment of a composite electromagnetic actuator apparatus in accordance with the present invention.

FIG. 9 shows a composite actuator apparatus employing the electromagnetic actuator in accordance with the present invention.

To be more specific, in the composite actuator apparatus, the electromagnetic actuator 100 in accordance with the present invention is combined coaxially with a stepping motor 310 at the rear side thereof, that is a two-phase claw-pole stepping motor controlled in an open loop and is installed on a frame of a conventional positioning apparatus 300.

A rotating shaft of the stepping motor 310 is provided with a lead screw 320. A supporting (movable) shaft 24 of the electromagnetic actuator 100 is common to the rotating shaft with the lead screw 320. A stator yoke 11 of the electromagnetic actuator 100 is mounted on the rear of the stepping motor 310 with a nonmagnetic spacer 330 provided actuator 100 therebetween in order to magnetically shield the electromagnetic actuator 100 from the stepping motor 310. The electromagnetic actuator 100 is supplied with power through terminals 103 and 104 provided on the terminal blocks 101 and 102, respectively, of respective bobbins (not shown).

When engaging the electromagnetic actuator 100 with the stepping motor 310, care must be taken not to disturb the balance of the axial permeance of the electromagnetic actuator 100 that travels in the axial direction. More specifically, it should be avoided to mount a soft magnetic member only on one end surface of the electromagnetic actuator 100. For this reason, when mounting the electromagnetic actuator 100 on the rear surface of the stepping motor 310, the nonmagnetic spacer 330 to be provided therebetween must be sufficiently thick to ensure magnetic isolation. This spacer 330 ensures an stable operation of the electromagnetic actuator 100. Experiments have revealed that the thickness of the spacer 330 is preferably equal to or larger than the thickness of the stator yoke 11 of the electromagnetic actuator 100.

The composite electromagnetic actuator apparatus is employed, for example, to drive a head of an information write/read device. A head assembly (not shown) retained on a moving pin (not shown) via a groove of the lead screw 320 travels in the axial direction as the lead screw 320 rotates.

If the head assembly is positioned far away from a target position, the positional adjustment is first made by the stepping motor 310. This is known as "rough adjustment" wherein quick and discrete positional control is carried out. And when it gets close to the target position, the adjustment is made by the electromagnetic actuator 100. This is known as "fine adjustment" wherein highly accurate and continuous closed-loop positioning control is carried out. The fine adjustment using the electromagnetic actuator 100 is preferably controlled on a closed loop, continuously or at a high sampling rate with an extremely short sampling time. In the drawing, arrows X and Y about the lead screw 320 denote the traveling directions of the lead screw 320. More specifically, the arrow X indicates the rotational motion by the stepping motor 310 in the rough adjustment operation, and the arrow Y indicates the axial motion by the electromagnetic actuator 100 in the fine adjustment operation. In either operation, the head assembly travels in the axial direction.

In the above embodiment, bearings are provided at two locations, namely, at the distal end of the lead screw 320 and at either the end of the electromagnetic actuator 100 or the stepping motor 310. This arrangement maximizes a bearing span, making a bearing mechanism stable. A flange 350 of the stepping motor, that is attached to the frame 340, is provided with no bearing mechanism.

Depending on the construction of a system, the range of the fine adjustment performed by the electromagnetic actuator 100 is preferably 1.0 mm or less in terms of an axial movable distance. This is because, as the movable distance increases, a larger thrust is needed to cover up to a certain response frequency, inevitably leading to an increase in cost and size. By using such a composite electromagnetic actuator apparatus, the rough adjustment function and the fine adjustment function can be completely separated. Therefore, a high-speed, high-accuracy and inexpensive positioning mechanism with a very little leakage flux as a whole can be achieved.

Thus, the present invention makes it possible to provide an inexpensive electromagnetic actuator that is free from the disadvantages inherent in a moving-coil type actuator and has a simple construction. Furthermore, the composite actuator apparatus employing the electromagnetic actuator in accordance with the present invention allows the rough adjustment function and the fine adjustment function to be completely separated. This makes it possible to achieve an inexpensive, high-speed and high-accuracy head positioning mechanism with a very little leakage flux for an information storage device.

What is claimed is:

1. An electromagnetic actuator, comprising:

(A) a stationary assembly that includes (1) a hollow stator yoke composed of a soft magnetic material and (2) two coils disposed coaxially and separately in a traveling direction of the actuator inside the hollow stator yoke; and (B) a movable assembly disposed in a hollow space of the two coils to oppose thereto with a very small clearance that includes (1) a movable magnet unit and (2) a movable yoke unit, both units mounted on a single supporting shaft adjacently to each other in an axial direction of the supporting shaft, wherein the movable assembly travels in the axial direction by an electromagnetic force generated with the coils by the interaction between a magnetic field generated by the movable magnet unit and a current flowing in the coils, wherein said movable magnet unit is disposed on said single supporting shaft so as to oppose said coils radially, wherein the two coils are wound on respective separate bobbins made of a synthetic resin and having a substantially identical shape with each other, and the two bobbins with the respective coils wound thereon are disposed axially inside the stator yoke with a predetermined distance provided therebetween, wherein a pair of flanges are provided at both axial end surfaces of the respective bobbins, and at least one of the flanges has a terminal block integrally formed with the flange, and wherein an upper edge and a lower edge of the hollow stator yoke are provided with cuts for receiving the terminal block.

2. An electromagnetic actuator according to claim 1, wherein the direction of the current passing through one of the two coils is opposite from the direction of the current passing through the other coil.

3. An electromagnetic actuator according to claim 1, wherein the stator yoke of the stationary assembly is a hollow cylinder, the two coils are ring-shaped and wound on the respective cylindrical bobbins;

the movable assembly has a supporting shaft at the center thereof, the movable yoke unit is located such that the movable yoke unit and the two coils effect electromagnetic action on each other; and a pair of flanges are provided at both axial end surfaces of the stator yoke, each flange having a bearing mechanism, the supporting shaft is retained by the bearing mechanisms so as to be movable in the axial direction.

4. An electromagnetic actuator according to claim 3, wherein the movable magnet unit of the movable assembly is formed of at least one columnar of hollow magnet axially magnetized with two opposite polarities, namely, north pole and south pole, and the movable yoke unit is constituted by a pair of soft magnetic members that have a substantially identical configuration with each other and are disposed to sandwich the movable magnet unit and to abut respectively against a north-pole end surface and a south-pole surface thereof.

5. An electromagnetic actuator according to claim 3, wherein the movable yoke unit of the movable assembly is constructed by one or more columnar or hollow soft magnetic members, the movable magnet unit is constructed by a pair of magnets that have a substantially identical configuration with each other, are disposed to sandwich the movable yoke unit and to abut against both axial end surfaces thereof and are magnetized so that the inward portion and the outward portion of one magnet are polarized oppositely from each other and that the outward portion of one magnet is polarized oppositely from the outward portion of the other magnet.

6. An electromagnetic actuator according to claim 1, wherein the stator yoke of the stationary assembly is a hollow cylinder, the two coils are ring-shaped and wound on the respective cylindrical bobbins;

the movable assembly has a supporting shaft at the center thereof, the movable yoke unit is located such that the movable yoke unit and the two coils effect electromagnetic action on each other; and a pair of flanges are provided at both axial end surfaces of the stator yoke, each flange having a bearing mechanism, the supporting shaft is retained by the bearing mechanisms so as to be movable in the axial direction.

7. An electromagnetic actuator according to claim 1, wherein the movable magnet unit of the movable assembly is formed of at least one columnar or hollow magnet axially magnetized with two opposite polarities, namely, north pole and south pole, and the movable yoke unit is constituted by a pair of soft magnetic members that have a substantially identical configuration with each other and are disposed to sandwich the movable magnet unit and to abut respectively against a north-pole end surface and a south-pole surface thereof.

8. The electromagnetic actuator according of claim 1, wherein said movable magnet unit is disposed to sandwich said movable yoke unit.

9. An electromagnetic actuator, comprising:

a stationary assembly that includes two coils disposed coaxially with each other inside a hollow stator yoke composed of a soft magnetic material; and a movable assembly that includes a movable magnet unit and movable yoke unit both disposed inside the coils with a very small clearance therefrom and both attached to a single supporting shaft such that the movable assembly is movable in the axial direction of the supporting shaft;

wherein the movable assembly travels in the axial direction by the electromagnetic between a magnetic field generated by the movable magnet unit and a current passing through the coils, and wherein the moveable magnet unit is disposed on said single supporting shaft so as to oppose said coils radially;

wherein the two coils are wound on respective separate bobbins made of a synthetic resin and having a substantially identical shape with each other, and the two bobbins with the respective coils wound thereon are disposed axially inside the stator yoke with a predetermined distance provided therebetween;

wherein the stator yoke of the stationary assembly is a hollow cylinder, the two coils are ring-shaped and wound on the respective cylindrical bobbins;

wherein the movable assembly has a supporting shaft at the center thereof, the movable yoke unit is located such that the movable yoke unit and the two coils effect electromagnetic action on each other; and wherein a pair of flanges are provided at both axial end surfaces of the stator yoke, each flange having a bearing mechanism, the supporting shaft is retained by the bearing mechanisms so as to be movable in the axial direction;

wherein the movable yoke unit of the movable assembly is constructed by one or more columnar or hollow soft magnetic members, the movable magnet unit is constructed by a pair of magnets that have a substantially identical configuration with each other, are disposed to sandwich the movable yoke unit and to abut against both axial end surfaces thereof and are magnetized so that the inward portion and the outward portion of one magnet are polarized oppositely from each other and that the outward portion of one magnet is polarized oppositely from the outward portion of the magnet; and wherein the outer diameter of the movable yoke unit of the movable assembly is set to be smaller than the outer diameter of the movable magnet unit.

10. An electromagnetic actuator according to claim 9, wherein the travel distance of the movable assembly in the axial direction is set to 1.0 mm or less.

11. An electromagnetic actuator, comprising:

a stationary assembly that includes two coils disposed coaxially with each other inside a hollow stator yoke composed of a soft magnetic material; and a movable assembly that includes a movable magnet unit and movable yoke unit both disposed inside the coils with a very small clearance therefrom and both attached to a single supporting shaft such that the movable assembly is movable in the axial direction of the supporting shaft, wherein the movable assembly travels in the axial direction by an electromagnetic force generated with the coils by the interaction between a magnetic field generated by the movable magnet unit and a current passing thought the coils, and wherein the movable magnet unit is disposed on said single supporting shaft so as to oppose said coils radially, wherein the movable magnet unit of the movable assembly is formed of a plurality of columnar magnets axially magnetized with two opposite polarities, namely, north pole and south pole, and the movable yoke unit is constituted by a pair of soft magnetic members that have a substantially identical configuration with each other and are disposed to sandwich the movable magnet unit and to abut respectively against a north-pole end surface and a south-pole surface thereof, and wherein the outer diameter of the movable yoke unit of the movable assembly is set to be smaller than the outer diameter of the movable magnet unit.

12. An electromagnetic actuator, comprising:

(A) a stationary assembly that includes (1) a hollow stator yoke composed of a soft magnetic material and (2) two coils disposed coaxially and separately in a traveling direction of the actuator inside the hollow stator yoke; and (B) a movable assembly disposed in a hollow space of the two coils to oppose thereto with a very small clearance that includes (1) a movable magnet unit and (2) a movable yoke unit, both units mounted on a supporting shaft adjacently to each other in an axial direction of the supporting shaft, wherein the movable assembly travels in the axial direction by the interaction between a magnetic field generated by the movable magnet unit and a current flowing in the coils, and wherein the movable yoke unit of the movable assembly is constructed by one or more columnar or hollow soft magnetic members, the movable magnet unit is constructed by a pair of magnets that have a substantially identical configuration with each other, are disposed to sandwich the movable yoke unit and to abut against both axial end surfaces thereof and are magnetized so that the inward portion and the outward portion of one magnet are polarized oppositely from each other and that the outward portion of one magnet is polarized oppositely from the outward portion of the magnet.

13. An electromagnetic actuator according to claim 12, wherein the outer diameter of the movable yoke unit of the movable assembly is set to be smaller than the outer diameter of the movable magnet unit.

14. An electromagnetic actuator according to claim 12, wherein the travel distance of the movable assembly in the axial direction is set to 1.0 mm or less.

15. An electromagnetic actuator, comprising:

(A) a stationary assembly that includes (1) a hollow stator yoke composed of a soft magnetic material and (2) two coils disposed coaxially and separately in a traveling direction of the actuator inside the hollow stator yoke; and (B) a movable assembly disposed in a hollow space of the two coils to oppose thereto with a very small clearance that includes (1) a movable magnet unit and (2) a movable yoke unit, both units mounted on a supporting shaft adjacently to each other in an axial direction of the supporting shaft, wherein the movable assembly travels in the axial direction by an electromagnetic force generated with the coils by the interaction between a magnetic field generated by the movable magnet unit and a current flowing in the coils, wherein said movable magnet unit is disposed on said single supporting shaft so as to oppose said coils radially, and wherein the movable magnet unit is disposed to sandwich the movable yoke unit.

* * * * *